United States Patent Office 2,955,110
Patented Oct. 4, 1960

2,955,110

SUBSTITUTED PTERIDINES AND METHOD OF PREPARING THE SAME

Ernest L. Patterson, Pearl River, N.Y., and Malcolm H. von Saltza, Madison, Wis., assignors to American Cyanamid Company, New York, N.Y., a corporation of Maine No Drawing. Filed Jan. 13, 1955, Ser. No. 481,704

4 Claims. (Cl. 260—251.5)

This invention relates to a new biologically active substance. More particularly, it relates to a biologically active substituted pteridine and a method for the preparation of the same.

In the past substituted pteridines such as pteroylglutamic acid, commonly called folic acid, have been found to be active in stimulating the growth of bacteria such as *Streptococcus fecalis* R. and to possess vitamin-like properties. Subsequently it was found that folic acid was also useful in stimulating hemaglobin formation and in the treatment of agranulocytosis.

We have now found a new substituted pteridine which is biologically active and is an essentially nutrient required for the growth of *Crithidia fasciculata*. This latter organism has been suggested as a test organism for the preliminary evaluation of antimalarials (Proceedings Society Experimental Biology & Medicine, 85, 117 (1954)). This test organism requires an exogenous source of folic acid (or closely related compounds) for growth, to which it responds quantitatively. The new growth factor for *Crithidia fasciculata*, through diligent and extensive study, has been found to have the following structure:

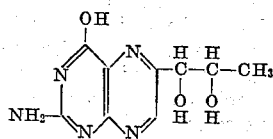

This product is a light yellow powder, slightly soluble in water and is relatively insoluble in alcohol, acetone, ether or benzene.

The new 2-amino-4-hydroxy-6-substituted pteridine of the present invention was obtained by adsorbing human urine on activated charcoal. The desired product was eluted from the charcoal with an aqueous alkaline or alcoholic alkaline solvent. The eluate was then diluted with a water immiscible alcohol. The water soluble impurities were separated from the active material by countercurrent distribution. Further impurities were removed by partition chromatography between water and an alcohol such as butanol or propanol. A mixture of the alcohol and a further solvent such as ethyl acetate can also be used. The partition chromatography process was repeated until the major portion of the impurities were removed. The desired product was then adsorbed chromatographically on magnesium silicate (Magnesol) and eluted with aqueous ammonia. The active product was then extracted into dilute mineral acid and solid impurities removed by filtration. The acid solution was then made alkaline and further solid impurities removed. The compound of the present invention was then obtained by neutralization with acid. Recrystallization from water removes any salt that may be present.

The new substituted pteridine was identified as having the 2-amino-4-hydroxy-6-dihydroxypropyl pterin structure based on the following experimental evidence and that described at the end of the examples. The ultra violet and infrared absorption spectra is substantially identical with that of well known 2-amino-4-hydroxypteridines. The acid periodate oxidation product of the pteridine produces an ultra violet absorption essentially identical with 2-amino-4-hydroxy-pteridine-6-carboxylic aldehyde. The permanganate oxidation product of the pteridine had an ultra violet absorption curve essentially identical with that of 2-amino-4-hydroxypteridine-6-carboxylic acid. Permanganate and periodate oxidation products therefore indicated only one other substituent on the pteridine nucleus other than those in the 2 and 4-positions. The infrared absorption curve indicated the presence of alkyl hydroxyl groups and a methyl group. The periodate oxidation was indicative of the group

The absence of a primary alcohol was noted since if this had been present, it would have oxidized to formaldehyde in the periodate oxidation, and no formaldehyde was detected. Therefore, the side chain must have been the alpha-beta-dihydroxypropyl radical. The side chain is indicated as being in the 6-position when the permanganate oxidation product of the pteridine had an ultra violet absorption curve essentially identical with 2-amino-4-hydroxypteridine-6-carboxylic acid. The 2-amino-4-hydroxy-6-dihydroxypropyl pteridine decomposed on heating at a temperature within the range of 250°–280° C. Decomposition on heating without a definite melting point is characteristic of 2-amino-4-hydroxy-6-substituted pteridines. Analysis of the 2-amino-4-hydroxy-6-dihydroxypropyl pteridine for carbon, hydrogen and nitrogen agreed closely with the theoretical values for 2-amino-4-hydroxy-6-dihydroxypropyl pteridine. The distribution coefficients between aqueous buffers and n-butanol were as follows:

| Aqueous buffer: | Distribution coefficient |
|---|---|
| pH 1.- N HCl | 0.042 |
| pH 3 0.05 M citrate | 0.24 |
| pH 5 0.05 M acetate | 0.25 |
| pH 7 0.05 M phosphate | 0.24 |
| pH 9 0.05 M borate | 0.036 |

The following examples illustrate the method for obtaining the biologically active product of the present invention.

*Example 1*

A sample of 175 liters of human male urine adjusted to pH 5 was stirred at 25° C. for one-half hour with 1.75 kilograms of activated charcoal (Norite A), 1.75 kilograms of diatomaceous earth (Super-Cel) was added and the solid separated by means of a centrifuge. The solid was made into a slurry with 15 liters of an eluting mixture of alcohol, water, concentrated ammonium hydroxide (50:25:25). The slurry was poured into a 10 inch diameter glass column set on a perforated steel plate to which vacuum could be applied. The solid was eluted by filtration with the eluting mixture until a total of 80 liters of liquid was collected. The solid was discarded and the liquid was reduced in the still to about 2 liters.

The reduced eluate was made up to 3 liters of 0.05 M phosphate pH 5 and saturated with 3 liters of n-butanol. This was the starting material for a 40 tube 60 transfer-one liter per phase solvent countercurrent distribution between 0.05 M phosphate n-butanol. The tubes (6–12) containing the desired product were combined and reduced in the still to 250 ml. and and combined with another batch equivalent to 175 liters of urine purified by the same procedure to the same stage.

The sample was adjusted to pH 2.5 and saturated with a mixture of n-butanol:ethyl acetate (35:65). This was the starting material for a partition chromatographic column in the system of diatomaceous earth (Celite) (3 x 23 inch column) supporting aqueous 0.05 M citrate pH 2.5 buffer and n-butanol:ethyl acetate (35:65) as the mobile phase. The fractions, containing about 90% of the activity, in the organic phase, based on growth of *Crithidia fasciculata*, were combined with material equivalent to 1200 liters of urine purified by the same procedures to the same stage. The composite was divided in half and each was purified by partition chromatography in the system of 0.01 M phosphate pH 3.2 supported on diatomaceous earth (Celite) 545 with n-butanol as the mobile phase. The material from the two columns was combined and further purified by partition chromatography in the three following systems:

0.01 M $HSO_4$ pH 2.3 on diatomaceous earth (Celite)-ethyl acetate:n-butanol 50:50

0.01 M $HSO_4$ pH 2.3 on diatomaceous earth (Celite)-ethyl acetate:n-butanol 35:15

0.01 M $H_2PO_4^-$ pH 5 on diatomaceous earth (Celite)-ethyl acetate:n-butanol 75:25

The product was further purified by chromatographic adsorption on magnesium silicate (Magnesol) with dilute aqueous ammonia as a developer. The product thus obtained was extracted from impurities with 0.5 N hydrochloric acid and precipitated by adjusting the solution to pH 6 with sodium hydroxide. The light yellow powder was crystallized three times from water. The aqueous solution shows strong blue fluorescence and the product crystallized in the form of spheres. The product, 2-amino-4-hydroxy-6-dihydroxypropylpterin, is soluble to the extent of more than 10 mg./ml. in 0.1 N sodium hydroxide or 0.1 N hydrochloric acid at 4° C. It is less than 1 mg./10 ml. soluble in alcohol, acetone, ether or benzene. The optical rotation is $[\alpha]_D^{25} = -50°$ (0.1 N HCl; C, 0.4). The product exhibited characteristic adsorption bands in the infrared region of the spectrum when suspended as a solid in potassium bromide at the following frequencies expressed in reciprocal centimeters: 3650, 3310, 2975, 2930, 1680, 1538, 1490, 1418, 1370, 1295, 1245, 1173, 1130, 1063 and 823. Ultraviolet adsorption in 0.1 N sodium hydroxide showed maxima at 254 and 263 m$\mu$ and a minimum at 304 m$\mu$. In 0.1 N hydrochloric acid there were maxima at 247 and 320 m$\mu$ and a minimum at 275 m$\mu$.

*Example 2*

Two 100 liter batches of urine were stirred one-half hour at pH 5 with 3 kilograms each of activated charcoal (Darco G-60). The charcoal was centrifuged off and the active material eluted from the charcoal by three successive suspensions in alcohol, water, concentrated ammonia 50/50/10, followed by filtration. The combined eluates from each batch were reduced to a small volume. The active material in each batch was further purified by solvent countercurrent distribution between n-propanol and one-third saturated aqueous ammonium sulfate pH 3 or one-half saturated aqueous ammonium sulfate pH 3. The fractions containing the active material (tubes 6–12) were reduced to about one-quarter their original volume and then one volume of methanol was added to precipitate the ammonium sulfate. The salt was filtered off and washed with methanol. The filtrate and washings were combined and reduced to a small volume. The reduced filtrate and washings of each batch were further purified by chromatographic adsorption on activated charcoal (Darco G-60) and developed with alcohol/water 50/50 containing 0.5% to 8% concentrated ammonia. The active fractions from the two columns were combined and reduced to a small volume.

The composite was purified by a series of three portion chromatographic columns. The systems were as follows:

(1) 0.1 N aqueous acetate pH 4.9 on diatomaceous earth (Celite) developed with n-butanol.

(2) One-quarter saturated aqueous ammonium sulfate pH 5 on diatomaceous earth (Celite) developed with n-butanol.

(3) 0.1 N aqueous phosphate pH 5 on diatomaceous earth (Celite) developed with ethyl acetate.

The active fractions from the last partition column were evaporated to near dryness and taken up in 0.5 N sodium hydroxide. The insoluble impurities were centrifuged off and the solution containing the active material was removed and adjusted to pH 2 with hydrochloric acid. The impurities that precipitated were centrifuged off and the solution that again contained the active material was adjusted to pH 5. The nearly pure active material that precipitated was centrifuged off and washed with water. The product obtained was found to be identical with that of Example 1.

We claim:

1. A method of preparing 2-amino-4-hydroxy-6-dihydroxypropylpterin which comprises passing human urine through charcoal, eluting said charcoal with an alkaline aqueous-alcoholic solution, diluting the eluate with a water immiscible alcohol, separating the water soluble impurities by countercurrent distribution, subjecting the active substance to partition chromatography between water and a member of the group consisting of butanol and propanol until the major portion of the impurities are removed and the active material is present in the organic phase, chromatographically adsorbing on magnesium silicate, eluting with aqueous ammonia, removing said ammonia and precipitating said compound from said aqueous solution with an acid.

2. A method of preparing 2-amino-4-hydroxy-6-dihydroxypropyl pterin which comprises passing human urine through charcoal, eluting said charcoal with an aqueous-ammonia-alcoholic solution, diluting the eluate with a water immiscible alcohol, separating the water soluble impurities by countercurrent distribution, subjecting the active substance to partition chromatography between water and butanol until the major portion of the impurities are removed and the active material is present in the organic phase, chromatographically adsorbing on magnesium silicate, eluting with aqueous ammonia, removing said ammonia and precipitating said compound from said aqueous solution with an acid.

3. A method of preparing 2-amino-4-hydroxy-6-dihydroxypropyl pterin which comprises passing human urine through charcoal, eluting said charcoal with an aqueous-ethanol-ammonium hydroxide solution, diluting the eluate with butanol, separating the water soluble impurities by countercurrent distribution, subjecting the active substance to partition chromatography between water and butanol until the major portion of impurities are removed and the active material is present in the organic phase, chromatographically adsorbing on magnesium silicate, eluting with aqueous ammonia, extracting said compound into dilute mineral acid, removing solid impurities and recovering said compound therefrom.

4. A compound of the formula:

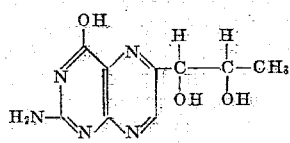

References Cited in the file of this patent

UNITED STATES PATENTS 2,520,156    Lindlar   _____ Aug. 29, 1950

OTHER REFERENCES

Rohdenburg et al.: Am. J. Cancer, vol. 29, pages 66–77 (1937).

UNITED STATES PATENT OFFICE
CERTIFICATE OF CORRECTION

Patent No. 2,955,110                      October 4, 1960

Ernest L. Patterson et al.

It is hereby certified that error appears in the printed specification of the above numbered patent requiring correction and that the said Letters Patent should read as corrected below.

Column 2, line 41, for "pH 1.-N HCl" read -- pH 1 0.1N HCl --

Signed and sealed this 25th day of April 1961.

(SEAL)
Attest:

ERNEST W. SWIDER                      DAVID L. LADD
Attesting Officer                      Commissioner of Patents